United States Patent
Katsev et al.

(10) Patent No.: US 12,026,166 B2
(45) Date of Patent: Jul. 2, 2024

(54) METHOD AND SYSTEM FOR DETERMINING RANK POSITIONS OF ELEMENTS BY A RANKING SYSTEM

(71) Applicant: YANDEX EUROPE AG, Lucerne (CH)

(72) Inventors: Ilya Vladimirovich Katsev, Saint-Petersburg (RU); Valeriya Dmitrievna Tsoy, Novosibirsk (RU)

(73) Assignee: Direct Cursus Technology L.L.C, Dubai (AE)

( * ) Notice: Subject to any disclaimer, the term of this patent is extended or adjusted under 35 U.S.C. 154(b) by 264 days.

(21) Appl. No.: 17/383,121

(22) Filed: Jul. 22, 2021

(65) Prior Publication Data

US 2022/0171782 A1    Jun. 2, 2022

(30) Foreign Application Priority Data

Nov. 30, 2020   (RU) ............................ RU2020139194

(51) Int. Cl.
  *G06F 16/2457*   (2019.01)
  *G06F 16/9538*   (2019.01)
  *G06N 20/00*    (2019.01)

(52) U.S. Cl.
  CPC .... *G06F 16/24578* (2019.01); *G06F 16/9538* (2019.01); *G06N 20/00* (2019.01)

(58) Field of Classification Search
  CPC .......... G06F 16/24578; G06F 16/9538; G06N 20/00

(Continued)

(56) References Cited

U.S. PATENT DOCUMENTS 8,180,768 B2    5/2012   Ceri et al.
8,606,769 B1 *  12/2013  Berry .................... G06F 16/953
                                                707/706

(Continued)

FOREIGN PATENT DOCUMENTS

CN    108829808 A    11/2018
CN    111104601 A    5/2020

(Continued)

OTHER PUBLICATIONS

English Abstract for CN108829808 retrieved on Espacenet on Jul. 22, 2021.

(Continued)

*Primary Examiner* — Grace Park
*Assistant Examiner* — Abdullah A Daud
(74) *Attorney, Agent, or Firm* — BCF LLP

(57) ABSTRACT

A method and system for determining rank positions of elements displayed on a search engine results page (SERP) by a ranking system. During a training phase of the ranking system, an indication of user interactions associated with a first ranked list of elements is acquired. The elements of the first ranked list were visually displayed on a first SERP. A score for a first content element is determined based on a size of the first content element and a ranking of the first content element. The ranking system is trained, based on the score, to predict a predicted usefulness score for the first content element. During an in-use phase of the ranking system, a ranked list of elements is determined based on a query. The ranking system determines a ranked position for a content element in the ranked list. A SERP based on the ranked list is output.

20 Claims, 8 Drawing Sheets

(58) Field of Classification Search
USPC .......................................................... 707/706
See application file for complete search history.

(56) References Cited

U.S. PATENT DOCUMENTS

| | | | |
|---|---|---|---|
| 9,092,489 | B1 | 7/2015 | Dasilva et al. |
| 9,183,299 | B2 | 11/2015 | Leigh et al. |
| 10,515,625 | B1 | 12/2019 | Metallinou et al. |
| 10,545,624 | B2 | 1/2020 | Meyerzon et al. |
| 10,824,627 | B2 * | 11/2020 | Rybalchenko ............ G06N 5/02 |
| 2009/0019035 | A1 * | 1/2009 | House ................... G06F 16/334 707/E17.084 |
| 2012/0130974 | A1 | 5/2012 | Leigh et al. |
| 2012/0323967 | A1 | 12/2012 | Ju et al. |
| 2013/0127920 | A1 * | 5/2013 | Grinshpon ................ G06F 3/14 707/723 |
| 2013/0268505 | A1 * | 10/2013 | Urbanski ........... G06Q 30/0601 707/706 |
| 2014/0122456 | A1 | 5/2014 | Dies |
| 2014/0122475 | A1 | 5/2014 | Li et al. |
| 2014/0122590 | A1 * | 5/2014 | Svendsen ........... G06Q 30/0631 709/204 |
| 2014/0143605 | A1 * | 5/2014 | Balla .................. G06F 9/44505 714/38.1 |
| 2014/0280219 | A1 * | 9/2014 | Maser .................. G11B 27/034 707/748 |
| 2014/0368511 | A1 * | 12/2014 | Baumgartner .......... G06T 13/00 345/473 |
| 2014/0379683 | A1 | 12/2014 | Bazaz |
| 2015/0120712 | A1 | 4/2015 | Yi et al. |
| 2015/0127637 | A1 * | 5/2015 | Cavanagh ............. G06F 16/951 707/723 |
| 2015/0142567 | A1 * | 5/2015 | Neelakant .......... G06Q 30/0256 705/14.54 |
| 2017/0075897 | A1 * | 3/2017 | Nikulin ............... G06F 16/9535 |
| 2017/0140053 | A1 | 5/2017 | Vorobev |
| 2017/0185602 | A1 * | 6/2017 | Gusev ................... G06F 16/951 |
| 2018/0075137 | A1 | 3/2018 | Lifar et al. |
| 2018/0096379 | A1 | 4/2018 | Rama et al. |
| 2018/0203921 | A1 * | 7/2018 | Privault .............. G06F 16/3323 |
| 2019/0034432 | A1 * | 1/2019 | Rybalchenko .......... G06N 20/00 |
| 2019/0163758 | A1 * | 5/2019 | Zhivotvorev ..... G06F 16/24578 |
| 2020/0110754 | A1 * | 4/2020 | Lamburt .......... G06F 16/24578 |
| 2021/0303648 | A1 * | 9/2021 | Kubota ............... G06F 16/9535 |
| 2021/0312560 | A1 * | 10/2021 | Hayward ............... G06N 3/088 |
| 2023/0252281 | A1 * | 8/2023 | Shamir .................. G06N 3/045 706/15 |

FOREIGN PATENT DOCUMENTS

| | | |
|---|---|---|
| EP | 3293646 A1 | 3/2018 |
| RU | 2666336 C1 | 9/2018 |
| RU | 2689812 C2 | 5/2019 |
| RU | 2692045 C1 | 6/2019 |
| WO | 2015188885 A1 | 12/2015 |

OTHER PUBLICATIONS

English Abstract for CN111104601 retrieved on Espacenet on Jul. 22, 2021.
Office Action issued on Jul. 5, 2023 in respect of the related U.S. Appl. No. 17/520,762.
Russian Search Report dated Jun. 23, 2022 issued in respect of the related Russian Patent Application No. RU 2021109882.
Russian Search Report dated May 30, 2022 issued in respect of the counterpart Russian Patent Application No. RU 2020139194.

* cited by examiner

METHOD AND SYSTEM FOR DETERMINING RANK POSITIONS OF ELEMENTS BY A RANKING SYSTEM

CROSS-REFERENCE TO RELATED APPLICATIONS

The present application claims priority to Russian Patent Application No. 2020139194, entitled "METHOD AND SYSTEM FOR DETERMINING RANK POSITIONS OF ELEMENTS BY A RANKING SYSTEM," filed on Nov. 30, 2020, the entirety of which is incorporated herein by reference.

FIELD OF TECHNOLOGY

The present technology relates to ranking elements and, more specifically, to methods and systems for determining rank positions of elements by a ranking system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (such as a desktop, laptop, notebook, smartphone, tablets and the like) to access content on these networks (such as text, images, audio, video, animation, and other digital content).

Generally speaking, a user can access a resource on the communication network by two principle means. The user can access a particular resource directly, either by typing an address of the resource, such as a uniform resource locator (URL), or by clicking a link, such as a link received in an e-mail or selected while browsing another web resource. Alternatively, the user may conduct a search using a search engine to locate a resource of interest. A search engine is particularly suitable in circumstances where the user knows a topic of interest, but the user does not know the exact address of the resource that they wish to access.

When the user runs a search using the search engine, they generally have two priorities. They want the search engine to locate the most relevant results and they want the results delivered relatively quickly. Search results are generally presented to the user on a webpage, such as a search engine results page (SERP). The SERP may contain any number of different types of results gathered from a variety of sources, such as general, textual search results from general internet searches, or particular types of search results (e.g., images and videos) retrieved from vertical searches. Search engines use a variety of methods to determine which search results are relevant in response to a search query, and how to display these results to the user.

Usually, search engines are configured to take into account a plethora of factors, including indications of previous user interactions associated with elements displayed on a SERP, when ranking these elements amongst each other based on their relevance to queries.

Search engines are also configured to iteratively update a pool of elements that can be potentially presented to users thereof. This iterative updating of the pool of elements is generally known as "crawling," during which a crawling application is configured to access a plurality of web resources and to collect elements that can be potentially presented to users of the search engine in response to queries Some elements may be displayed in a SERP as a content element (which may be referred to as a widget). Typical elements in a SERP allow the user to select the element and then proceed to a web page corresponding to the element. A content element may allow for various user interactions with the content element. For example, a music content element may be displayed that plays audio when the user interacts with the content element. In this example, the music may be played while the user continues to view the SERP. In another example, an images content element may be displayed. The images content element may display various images responsive to a search query.

Because content elements are different from a traditional element, such as having a different size and/or appearance, ranking methods that work well for traditional elements might not be applicable to content elements. For the foregoing reasons, there is a need for new methods and systems for ranking elements.

U.S. Pat. No. 10,642,905 issued to Yandex Europe AG, on May 5, 2020, discloses methods and systems for generating a SERP. The method is executable at a server executing a search engine, the server being accessible via a communication network by at least one electronic device. The method comprises, as part of generating a search result list, the search result list containing a first search result and a second search result, predicting a first interest parameter for the first search result; predicting a second interest parameter for the second search result; predicting a usefulness parameter for the first search result, the predicting being at least partially based on the first interest parameter and the second interest parameter; adjusting a position of the first search result within the ranked search result list based on the predicted usefulness parameter, the adjusting resulting in the first search result being at an adjusted position within the ranked search result list.

U.S. Pat. No. 10,275,406 issued to Yandex Europe AG, on Apr. 30, 2019, discloses methods and systems for generating a SERP responsive to receiving a search query. A ranked plurality of search results is generated, including at least one general search result and at least one vertical search result, the ranked plurality of search results having been ranked based at least in part on a usefulness parameter. The usefulness parameter indicates the optimal position of the at least one vertical search result in the ranked plurality of search results based on its determined usefulness relative to the search query. The usefulness parameter is predetermined based on a training set of user data on past user interaction with the at least one vertical search result when its original rank was modified such that the at least one vertical search result was ranked randomly and placed on the previous SERP at a random position.

U.S. Pat. No. 9,183,299 issued to International Business Machines Corporation, on Nov. 10, 2015, discloses a method, apparatus and computer program for a search engine to rank a set of pages returned as search results from a search query. The search query and a first origin page are received. The search query includes one or more keywords and the first origin page is chosen based on information associated with the search query. A set of results is generated based on the one or more keywords. The click distance from the first origin page to each page in the returned set is then calculated. The click distance represents the number of intermediate pages that a user would need to traverse in order to progress from the first origin page to a page in the set of search results. The set of search results are then ranked based on the calculated click distance from the first origin page to a page in the set of results.

SUMMARY

Developers of the present technology have appreciated that SERPs may be improved by accounting for additional features when determining the ranking of elements in the SERP. The size of an element when displayed in the SERP and/or the distance of the element from the top of the SERP may be accounted for when determining a predicted usefulness score for an element. The predicted usefulness score for an element may be used to determine a ranking for the element in an SERP.

Embodiments of the present technology have been developed based on developers' appreciation of at least one technical problem associated with the prior art solutions. Therefore, developers have devised methods and systems for determining rank positions of elements by a ranking system for display in a SERP. Moreover, developers have devised methods and systems that allow training a ranking system to predict usefulness scores of elements for various ranked positions and using the predicted usefulness scores for selecting a placement of the elements on a SERP.

In a first broad aspect of the present technology, there is provided a method of determining rank positions of elements displayed on a SERP by a ranking system, the ranking system having been trained to rank elements based on previous user interactions, the method executable by a server, the method comprising: during a training phase of the ranking system: acquiring, by the server, an indication of user interactions associated with a first ranked list of elements, elements of the first ranked list of elements having been visually displayed on a first SERP to a user in response to a training query, wherein the first ranked list of elements comprises a first content element; determining, by the server, a score for the first content element based at least in part on: a size of the first content element on the first SERP, and a ranking of the first content element; and training, by the server, the ranking system to predict a predicted usefulness score for the first content element based on the score for the first content element; and during an in-use phase of the ranking system: receiving, by the server, an in-use query from a user; generating, by the ranking system based on the in-use query, a second ranked list of elements; determining, by the ranking system, a ranked position for a second content element in the second ranked list of elements based at least in part on a size of the second content element and a distance between the second content element and a top-ranked element of the second ranked list of elements; placing, by the server, the second content element in the second ranked list of elements at the ranked position; and generating, based on the second ranked list of elements, a second SERP.

In some implementations of the method, determining the score for the first content element comprises: after determining that the user selected an element displayed above the first content element on the first SERP, setting the score to zero.

In some implementations of the method, determining the score for the first content element comprises: after determining that the user selected the first content element on the first SERP, setting the score to one.

In some implementations of the method, determining the score for the first content element comprises, after determining that the user selected an element displayed below the first content element on the first SERP: determining a first height of the first content element; determining a second height of the element displayed below the first content element; and subtracting the first height divided by the second height from the score.

In some implementations of the method, determining the ranked position for the second content element comprises determining, for each position in the ranked list, a predicted usefulness score of the second content element.

In some implementations of the method, the ranked position for the second content element has a highest predicted usefulness score of the predicted usefulness scores.

In some implementations of the method, determining the score for the first content element comprises determining the score based at least in part on an amount of time that a user accessed the first content element.

In some implementations of the method, the second content element comprises one or more images or videos.

In some implementations of the method, determining the score for the first content element comprises determining the score based at least in part on a horizontal position of the first content element.

In some implementations of the method, determining the score for the first content element comprises: determining a distance on the SERP of the first content element from a highest ranked element; and determining, based at least in part on the distance, the score.

In another broad aspect of the present technology, there is provided a method of determining rank positions of elements displayed on a SERP by a ranking system, the ranking system having been trained to rank elements based on previous user interactions, the method executable by a server, the method comprising: during a training phase of the ranking system: acquiring, by the server, an indication of user interactions associated with a first ranked list of elements, elements of the first ranked list of elements having been visually displayed on a first SERP to a user in response to a training query; determining, by the server, a score for each element of the first ranked list of elements based at least in part on: a size of the respective element on the first SERP, and a ranking of the respective element; and training, by the server, the ranking system to predict a predicted usefulness score for elements on an SERP based on the determined score for each element; and during an in-use phase of the ranking system: receiving, by the server, an in-use query from a user; generating, by the ranking system based on the in-use query, a set of elements; determining, by the ranking system, a ranked position for each element of the set of elements based at least in part on a size of each respective element, thereby generating a second ranked list of elements; and generating, based on the second ranked list of elements, a second SERP.

In some implementations of the method, determining the score for each element of the first ranked list of elements comprises: after determining that the user selected an element displayed above a respective element on the first SERP, setting the score of the respective element to zero.

In some implementations of the method, determining the score for each element of the first ranked list of elements comprises: after determining that the user selected a respective on the first SERP, setting the score of the respective element to one.

In some implementations of the method, determining the score for each element of the first ranked list of elements comprises: after determining that the user selected an element displayed below a respective element on the first SERP: determining a first height of the respective element; determining a second height of the element displayed below the respective element; and subtracting the first height divided by the second height from the score of the respective element.

In some implementations of the method, determining the ranked position for each element of the set of elements comprises determining, for each element of the set of elements, a predicted usefulness score for each available ranking of the respective element.

In some implementations of the method, determining the ranked position for each element of the set of elements comprises selecting, for each element of the set of elements, a ranking having a highest predicted usefulness score.

In some implementations of the method, the method further comprises triggering a visual display of the second SERP.

In some implementations of the method, the indication of user interactions comprise an indication of: a selection of an item in the first SERP, a long selection of the item, the selection of the item followed by a web resource transition, playing audio corresponding to the item, or a hovering action over the item.

In another broad aspect of the present technology, there is provided a system. The system comprises: at least one processor, and memory storing a plurality of executable instructions which, when executed by the at least one processor, cause the system to: during a training phase of a ranking system: acquire an indication of user interactions associated with a first ranked list of elements, elements of the first ranked list of elements having been visually displayed on a first SERP to a user in response to a training query, wherein the first ranked list of elements comprises a first content element; determining a score for the first content element based at least in part on: a size of the first content element on the first SERP, and a ranking of the first content element; and training the ranking system to predict a predicted usefulness score for the first content element based on the score for the first content element; and during an in-use phase of the ranking system: receiving an in-use query from a user; generating, by the ranking system based on the in-use query, a second ranked list of elements; determining, by the ranking system, a ranked position for a second content element in the second ranked list of elements based at least in part on a size of the second content element and a distance between the second content element and a top-ranked element of the second ranked list of elements; placing, by the server, the second content element in the second ranked list of elements at the ranked position; and generating, based on the second ranked list of elements, a second SERP.

In some implementations of the system, the instructions that cause the system to determine the score for the first content element comprises instructions that cause the system to compare the size of the first content element on the first SERP to a size of a selected element on the first SERP.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" may be any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. Some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" may be any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology may each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
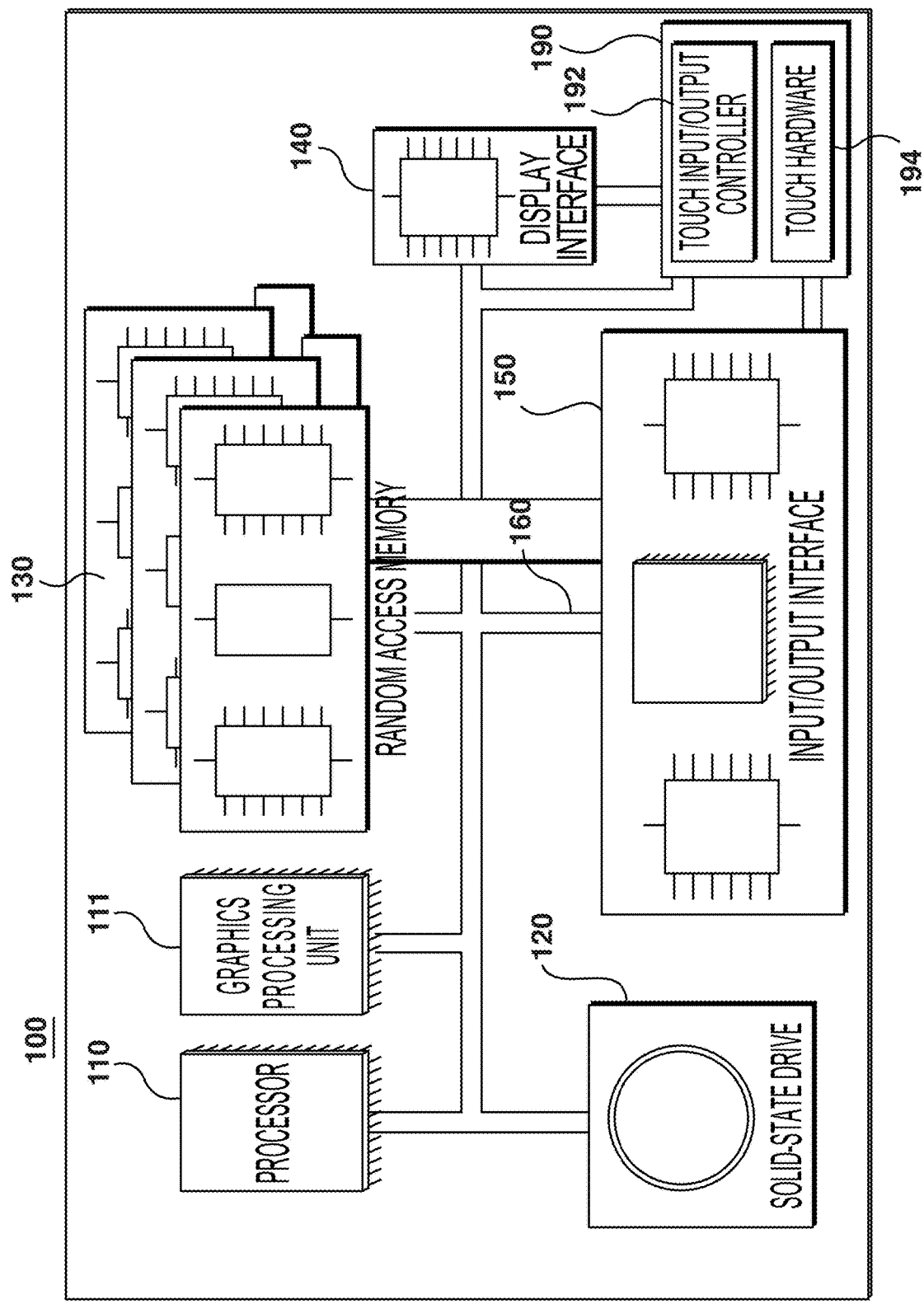
FIG. 1 depicts a schematic diagram of an example computer system for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology. In some embodiments, the computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random access memory 130, and an input/output interface 150. The computer system 100 may be a computer specifically designed to operate a machine learning algorithm (MLA). The computer system 100 may be a generic computer system.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may also be specifically dedicated to the implementation of the present technology. As a person in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computer system 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Figure 2:
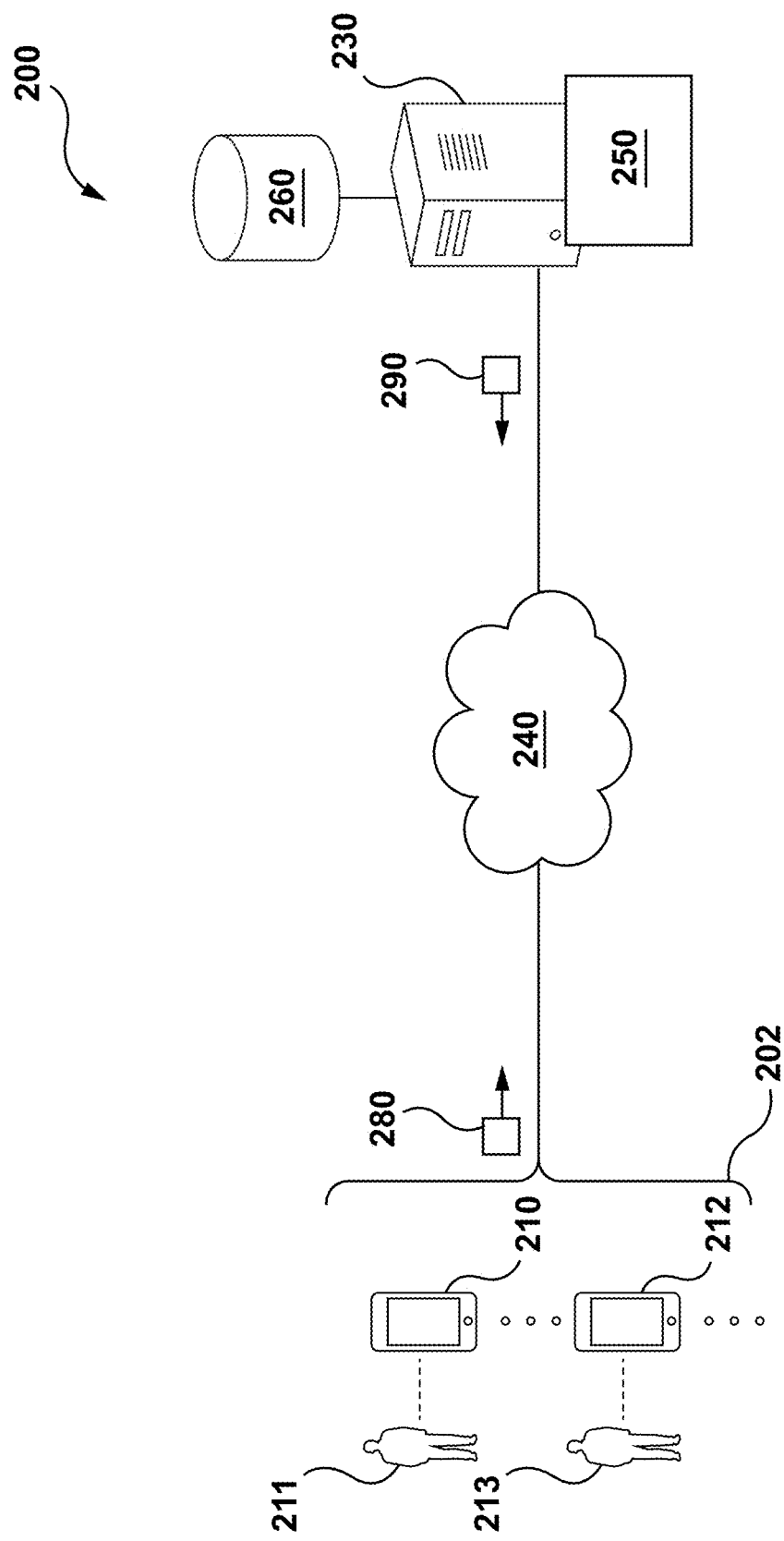
FIG. 2 depicts a networked computing environment according to some embodiments of the present technology.

FIG. 2 illustrates a networked computing environment 200 suitable for use with some embodiments of systems and/or methods of the present technology. The networked computing environment 200 comprises a plurality of electronic devices 202 and a server 230 which are communicatively coupled via a communications network 240. The plurality of electronic devices 202 comprises electronic devices 210 and 212 respectively associated with users 211 and 213. It should be noted that the plurality of electronic devices 202 may comprise a larger number of electronic devices such as 100, 1000, 10000, 1000000, and the like. It should be noted that the networked computing environment 200 may comprise other electronic devices such as, but not limited to, resource servers (not depicted) for providing web resources, without departing from the scope of the present technology. Some or all of the devices in the networked computing environment 200, including the electronic devices 202, may be computer systems 100. The electronic devices 202 may be wireless communication devices such as a mobile telephone (e.g. a smart phone or a radio-phone), a tablet, a personal computer and the like.

As previously mentioned, a user 211 or 213 is associated with a respective electronic device 210 or 212. The devices 210 and 212 may be associated with the users 211 and 213 through any means, such as by the users 211 and 213 being registered and/or logged in with a service, and/or based on an association between an identifier of the devices 210 and 212 (such as an IP address) and the users 211 and 213.

The electronic devices 210 and 212 may comprise some or all of the components of the computer system 100 depicted in FIG. 1. The electronic devices 210 and 212 may comprise hardware and/or software and/or firmware, or a combination thereof, for executing a web browser application and communicating with the server 230 via the communications network 240. The web browser application may provide access to one or more web resources via the communications network 240. One example of the web browser application is a Yandex™ browser, but any web browser may be used, such as a mobile device web browser.

In some embodiments of the present technology, the communications network 240 is the Internet. In alternative non-limiting embodiments, the communication network 240 may include a local area network (LAN), wide area network (WAN), a private communication network, and/or the like. All or portions of the communication network 240 may be a wireless communication link. Examples of wireless communication links include, but are not limited to, a 3G, 4G, 5G communication network link and the like.

In some embodiments of the present technology, the server 230 may be a conventional computer server. For example the server 230 may be a Dell™ PowerEdge™ Server running the Microsoft™ Windows Server™ operating system. The functionality of the server 230 may be distributed to any number of servers 230 and may be implemented via multiple servers 230.

In some embodiments of the present technology, the server 230 may host one or more computer-executed services such as a search engine. In other words, the server 230 may be under control and/or management of a search engine provider (not depicted), such as, for example, an operator of the Yandex™ search engine. The server 230 may be configured to execute one or more searches responsive to queries submitted by users of the search engine. The server 230 may be configured to generate and/or send, to any one of the plurality of electronic devices 202, a response data packet 290 via the communications network 240. How the server 230 is configured to generate and send the response data packet 290 as well as the content of the response data packet 290 will be further described below.

There is also depicted a database 260 that is communicatively coupled to the server 230. Even though in the depicted embodiment the database 260 is coupled directly to the server 230 (such as via a private network), in alternative implementations, the database 260 may be communicatively coupled to the server 230 via the communications network 240.

Although the database 260 is illustrated in FIG. 2 as a single entity, the database 260 may be implemented in a distributed manner, for example, the database 260 could have different components, each component being configured for a particular kind of retrieval therefrom or storage therein. The database 260 may be a structured collection of data, irrespective of its particular structure or the computer hardware on which data is stored, implemented or otherwise rendered available for use. The database 260 may reside on the same hardware as a process that stores or makes use of the information stored in the database 260 or it may reside on separate hardware. Generally speaking, the database 260 may receive data from the server 230 for storage thereof and may provide stored data to the server 230 for use thereof.

The database 260 may store information associated with web-resource elements that are available from a plurality of resources (i.e., the resource servers) and accessible via the communications network 240. The process of populating and maintaining the database 260 is generally known as "crawling." These web-resource elements may be potentially presented to users of the search engine in response to queries submitted to the search engine. The process of crawling can be executed (and repeated) on a regular (and recurring) basis. Through the re-execution of the process of crawling, the database 260 is populated with an indication of new resources/web-resource elements available via the communications network 240. For the sake of simplicity only, the web-resource elements will be referred herein simply as "elements."

It is contemplated that elements may be associated with, and classified in the database 260 by, their respective element types. For example, a given element may be an image-type element, a video-type element, an audio-type element, a news-type element, a resource-type element and/or any other element type. Operators of the server 230 may define the element types. Content elements corresponding to the element-type may be displayed on a SERP. For example, an audio content element may be output to a SERP when an audio-type element is responsive to a query. The audio content element may allow the user to listen to audio corresponding to the audio-type element without browsing away from the SERP.

The database 260 may also store element-inherent characteristics associated with each element. Some element-inherent characteristics may be retrieved from the respective resources corresponding to these elements, while other element-inherent characteristics may be determined by the server 230. For example, the database 260 may store information related to:

element size of each element (e.g., height and/or width in pixels, and/or visual size of elements, when rendered on a computer screen);
color scheme of each element;
presence of an object in each element (e.g., determined via various computer vision techniques);
element-type of each element;
resource of each element (e.g. URL corresponding to the element); and
freshness parameter of each element (e.g., a value that is inversely proportional to elapsed time since each element has been crawled).

However, it should be noted that other or additional element-inherent characteristics associated with elements are contemplated in other embodiments without departing from the scope of the present technology.

In addition to storing information associated with elements, the database 260 may be configured to store indications of user interactions respectively associated with each element. The user interactions associated with an element that are stored in the database 260 may be previous user interactions that users of the search engine performed with respect to the element as part of their interactions with the SERP that included the element. A non-exhaustive list of various user interactions that a user can execute in association with an element is:

a selection of the element (e.g., a "click" on the element);
a long selection of the element (e.g., a long "click" on the element);
the selection of the element followed by a web resource transition (e.g., a click on the element followed by a redirection to the resource corresponding to the element);
a hovering action over the element (e.g., cursor hovering time over the element); and/or
interaction with a content element (e.g. playing audio or a video, zooming in on an image, interacting with a map, selecting a data for a weather content element, etc.).

However, it should be noted that indications of other user interactions may be stored in the database 260 in association with elements in other embodiments without departing from the scope of the present technology.

Some elements stored in the database 260 are associated with less user interactions than others. In other words, some elements that are stored in the database 260 are associated with limited user interactions. For example, some elements may be used elements that have been frequently used by users of the search engine and, therefore, are associated with a considerable amount of user interactions, while other elements may be fresh elements that are associated with a limited amount of user interactions since they have been "crawled" only recently and have been rarely presented to the users or not presented at all.

The database 260 may also be configured to store information regarding a plurality of queries submitted to the search engine by various users thereof. This means that the database 260 may be configured to store query features associated with queries submitted to the search engine. The query features may comprise statistical information regarding query submissions such as, for example, a recent submission frequency of any given query to the search engine of the server 230. A recent submission frequency of a given query may correspond to a total number of submissions of the given query, for example, in the last twenty-four (24) hours. Any other statistical information regarding query submissions may be stored in the database 260.

In some embodiments of the present technology, the server 230 also implements a ranking system 250 for selecting elements corresponding to a search query and ranking them in response to queries submitted thereto by users of the search engine. Generally speaking, a ranking system 250 is configured to select elements that are generally-relevant to a given query and to gather indications of user interactions associated with these elements for further ranking based on their relevancy to the query. In other words, the ranking system 250 may comprise a user-interaction-based ranking algorithm that is configured to rank elements based on user interactions associated therewith.

The ranking system 250 may have been trained to rank elements based on the user interactions associated therewith. For example, the ranking system 250 may be a machine learning algorithm (MLA) that has been trained to predict usefulness scores of elements, based on, amongst other things, the previous user interactions associated with the elements. The ranking system 250 may have been trained to learn relationships and/or data patterns in the previous user interactions that are indicative of the relevance of elements to a query.

The user 211 may interact with the electronic device 210 which, in response to the user interaction with the electronic device 210, may execute the browser application. The user 211 may then use the browser application to submit a query to the search engine of the server 230. For example, the user 211 may enter the query "*Explosion in metro*" into the browser application. In response, the electronic device 210 may generate a submission data packet 280. The submission data packet 280 may comprise information indicative of the query "*Explosion in metro*" and may be sent to the server 230 via the communications network 240, thereby submitting the query "*Explosion in metro*" to the search engine.

Upon receiving the submission data packet 280, the server 230 may transmit the information indicative of the query "*Explosion in metro*" to the ranking system 250 for further processing. The ranking system 250 may access the database 260 in order to retrieve elements responsive to the query "*Explosion in metro*." The ranking system 250 may determine that elements are responsive to a given query based on various factors. For example, the ranking system 250 may:

analyze textual information, such as description or file name, associated with elements in the database 260 for textual string similarity to the query;

determine a number of duplicates of elements in the database 260;

analyze a uniform resource locator (URL) associated with a source resource for an element in the database 260 for textual string similarity to the query;

analyze information gathered via computer vision techniques in association with elements in the database 260; and/or analyze any other characteristic of an element in the database 260.

The ranking system 250 may generate a ranked set of elements responsive to the query. A SERP may then be generated based on the ranked set of elements. The SERP may be transmitted to the electronic device 210 via the response data packet 290. A user of the electronic device 210 may interact with the SERP. The user interactions with the SERP may be recorded and transmitted to the server 230. These interactions may be used to further train the ranking system 250.

Figure 3:
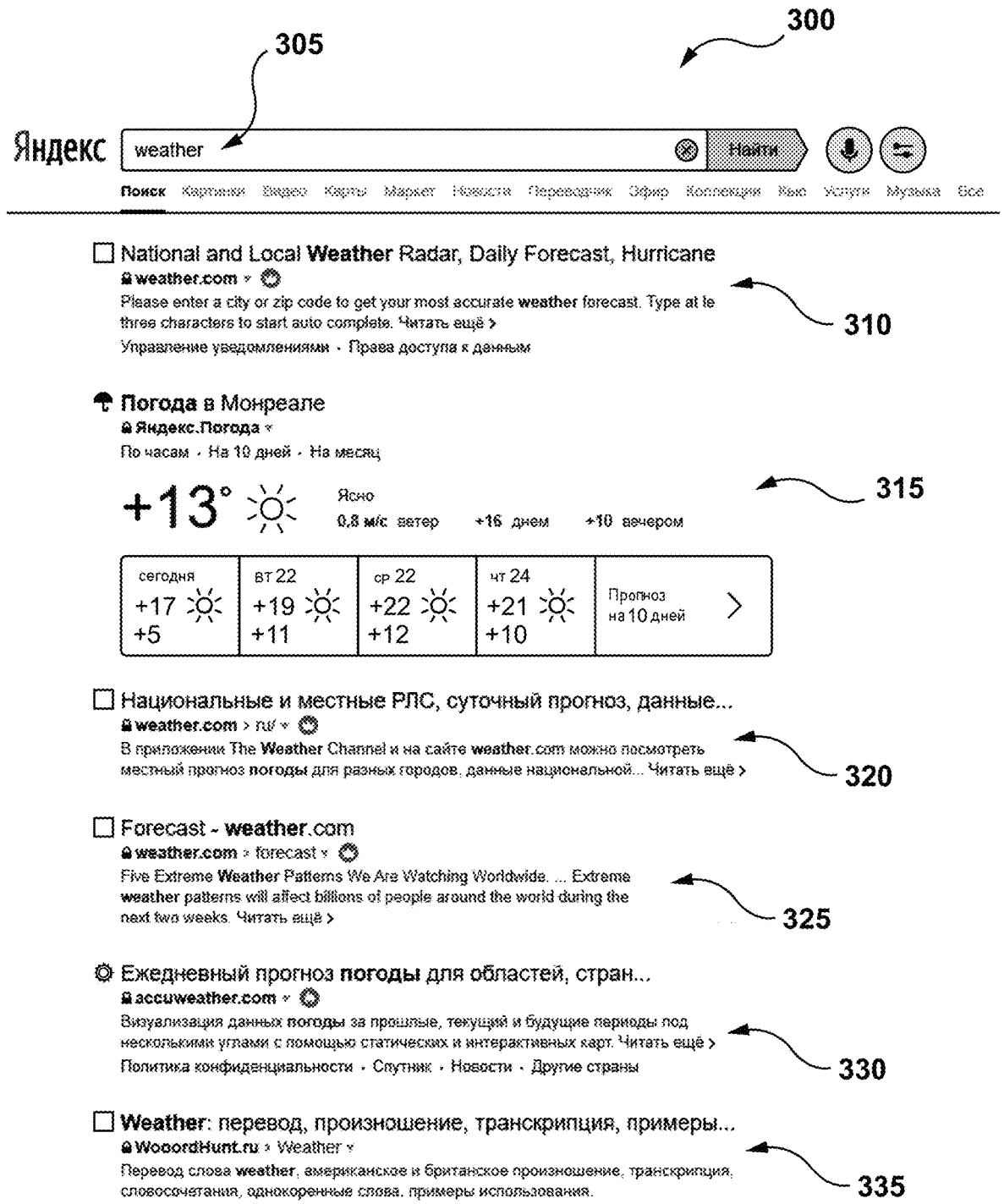
FIG. 3 depicts a search engine results page (SERP) according to some embodiments of the present technology.

With reference to FIG. 3, there is depicted a SERP 300 according to some embodiments of the present technology. The SERP 300 may be generated by a search engine server, such as the server 230. The SERP 300 includes various elements responsive to a query 305, which in the example SERP 300 is the query "weather."

Elements 310, 315, 320, 325, 330, and 335 were selected as elements responsive to the query 305. The elements 310-35 were ranked and are displayed in a ranked order. The element 310 was predicted to be the most relevant element of the displayed elements and is thus the highest-ranked element displayed in the SERP 300. Similarly, the element 335 was predicted to be the least relevant element of the displayed elements and is the lowest-ranked element displayed in the SERP 300.

Element 315 is a content element, which may also be referred to as a "widget." In addition to displaying text, the content element 315 includes a graphical display of weather information. The user may be able to interact with the content element to display additional information without leaving the SERP 300. The elements 310-35 may have different vertical and horizontal dimensions. For example the content element 315 is vertically larger than the element 310. Although a weather content element is displayed in the SERP 300, various other types of content elements may be displayed in a SERP. For example a video content element may be displayed that allows a user to play a video without leaving the SERP 300.

The ranking system 250 may be used to rank the elements 310-35 displayed in the SERP 300. The ranking system 250 may predict, for each of the elements 310-35, a predicted usefulness score at each potential ranked position. Based on these predicted usefulness scores, the ranking system 250 may select a ranking for each of the elements 310-35. A first ranking system 250 may be used to determine a predicted usefulness score for the elements 310, 320, 325, 330, and 335, and a second ranking system 250 may be used to determine a predicted usefulness score for the content element 315. Alternatively, a same ranking system 250 may be used to determine a predicted usefulness score for each of the elements 310-35.

Figure 4:
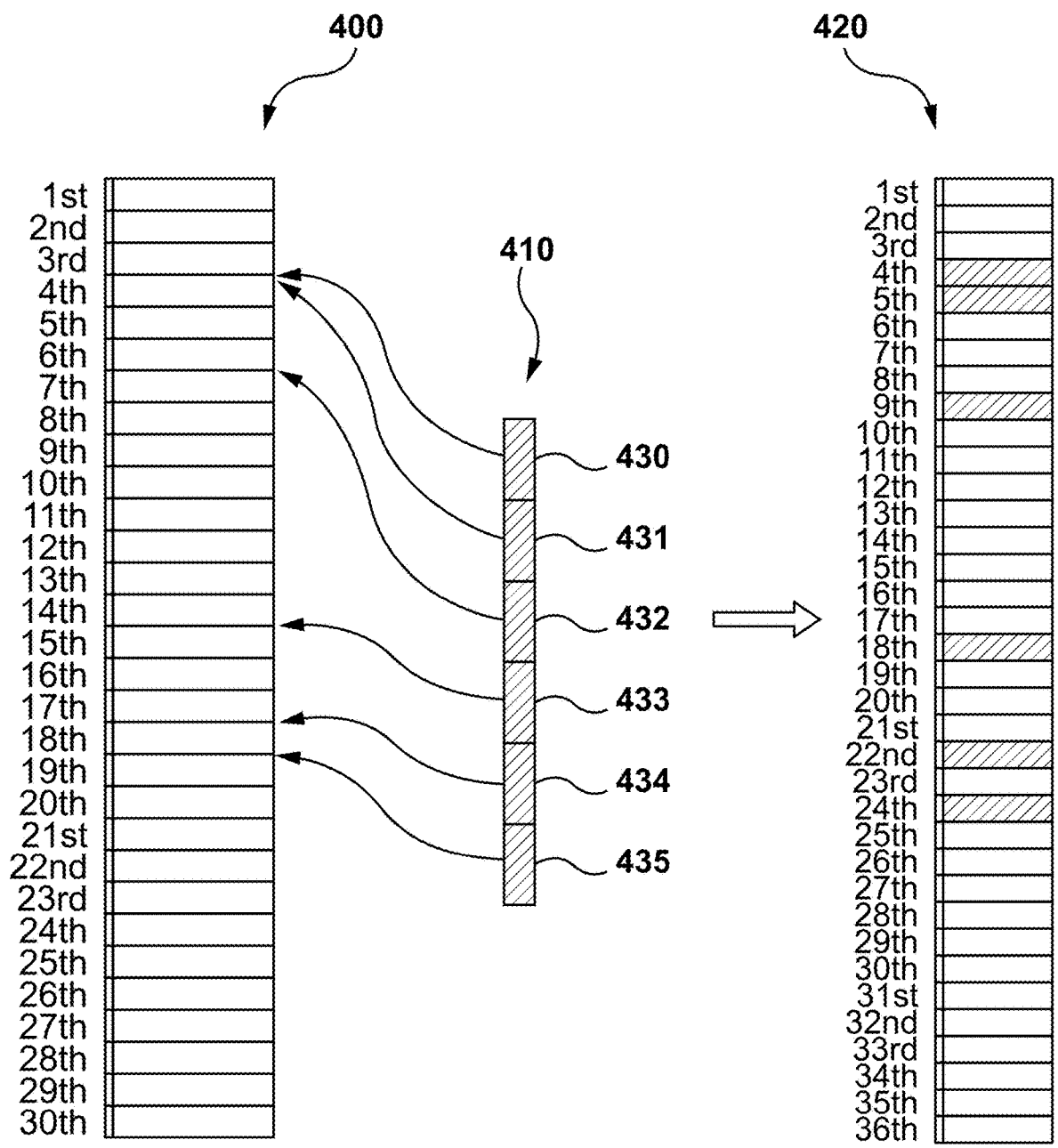
FIG. 4 depicts a ranked list of elements according to some embodiments of the present technology.

FIG. 4 depicts a ranked list of elements according to some embodiments of the present technology. A ranked list 400 includes 30 elements that are responsive to a query. As discussed above, in some instances, content elements, such as the content element 315, may be ranked using a separate ranking system 250 from regular elements. A set 410 of content elements 430-35 may have been determined as responsive to the query that resulted in the ranked list 400.

In order to merge the content elements 430-35 with the ranked list 400, a ranking may be determined for each of the content elements 430-35. The ranking may be determined by a ranking system 250. The ranking may be determined based on a predicted usefulness score for each of the content elements 430-35. For the content element 430, the ranking system 250 may determine a predicted usefulness score for every potential ranking, or a subset of every potential ranking, of the content element 430. In other words, the ranking system 250 may determine a first predicted usefulness score of the content element 430 if it were ranked first in the ranked list 400, a second predicted usefulness score if the content element 430 were ranked second in the ranked list 400, etc. The ranking with the highest predicted usefulness score may be selected as the ranking for the content element 430. Similarly, a ranking may be determined for each of the other content elements 431-35.

After determining a ranking for each of the content elements 430-35, a second ranked list 420 may be generated. The second ranked list 420 may be generated as a result of merging the content elements 430-35 with the ranked list 400. The ranked list 420 may then be used to generate a SERP, such as the SERP 300. The SERP may display all or a portion of the elements in the ranked list 420.

Figure 5:
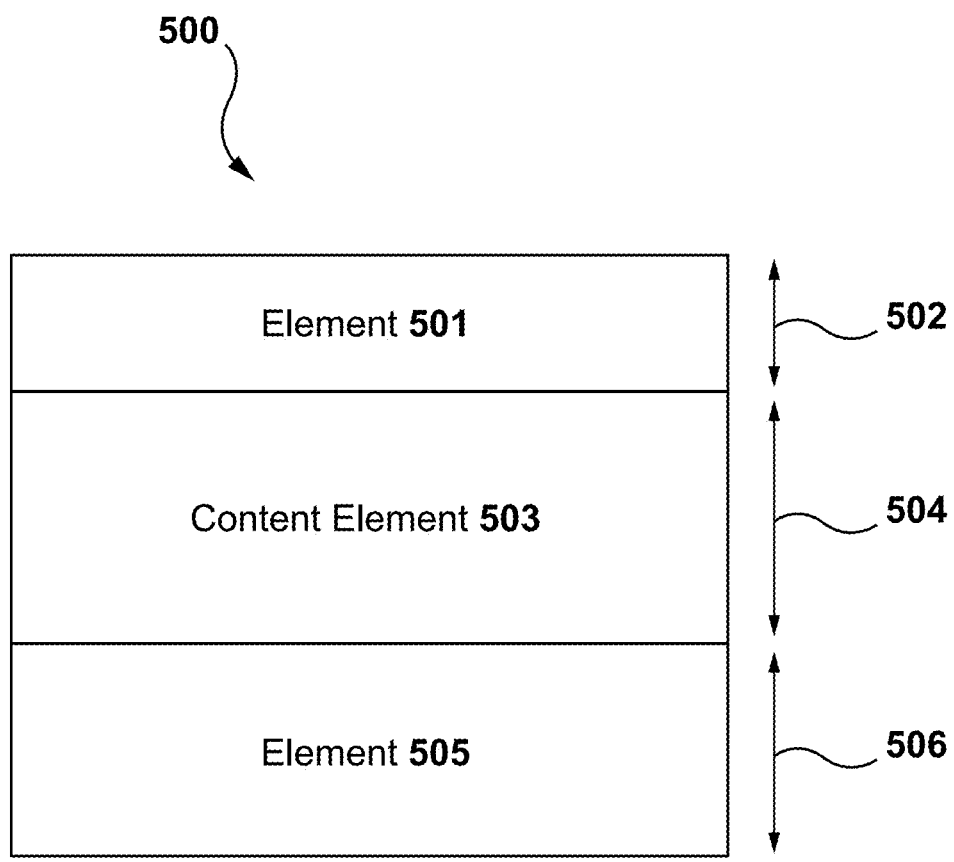
FIG. 5 is a flow diagram of a method for training a machine learning algorithm (MLA) to predict a usefulness score according to some embodiments of the present technology.

FIG. 5 depicts elements on a SERP 500 according to some embodiments of the present technology. As described above, elements in a SERP may have different lengths and/or widths. In the SERP 500 the highest-ranked element 501 has a height 502, the second-highest ranked content element 503 has a height 504, and the lowest-ranked element 505 has a height 506. As can be seen in FIG. 5, each of the heights 502, 504, and 506 are different. The likelihood that a user would select one of the elements in the SERP 500 may be affected by the rank of the element, distance of the element from the top of the SERP 500, and/or the height of the element. As the height of an element increases, the likelihood that a user will select that element may also increase. For example, if the content element 503 had the height 502 instead of the height 504, a user may be less likely to select the content element 503. As will be discussed in further detail below, the height of an element may be used to predict a usefulness score of the element and/or determine a ranking for the element in a SERP. By considering the height of the element, the predicted usefulness of an element may more accurately reflect the actual usefulness of the element. In turn, elements that a user will find relevant to a query may be more likely to be placed at the top of a SERP.

Method for Training an MLA (Non-Limiting Embodiment)

Figure 6:
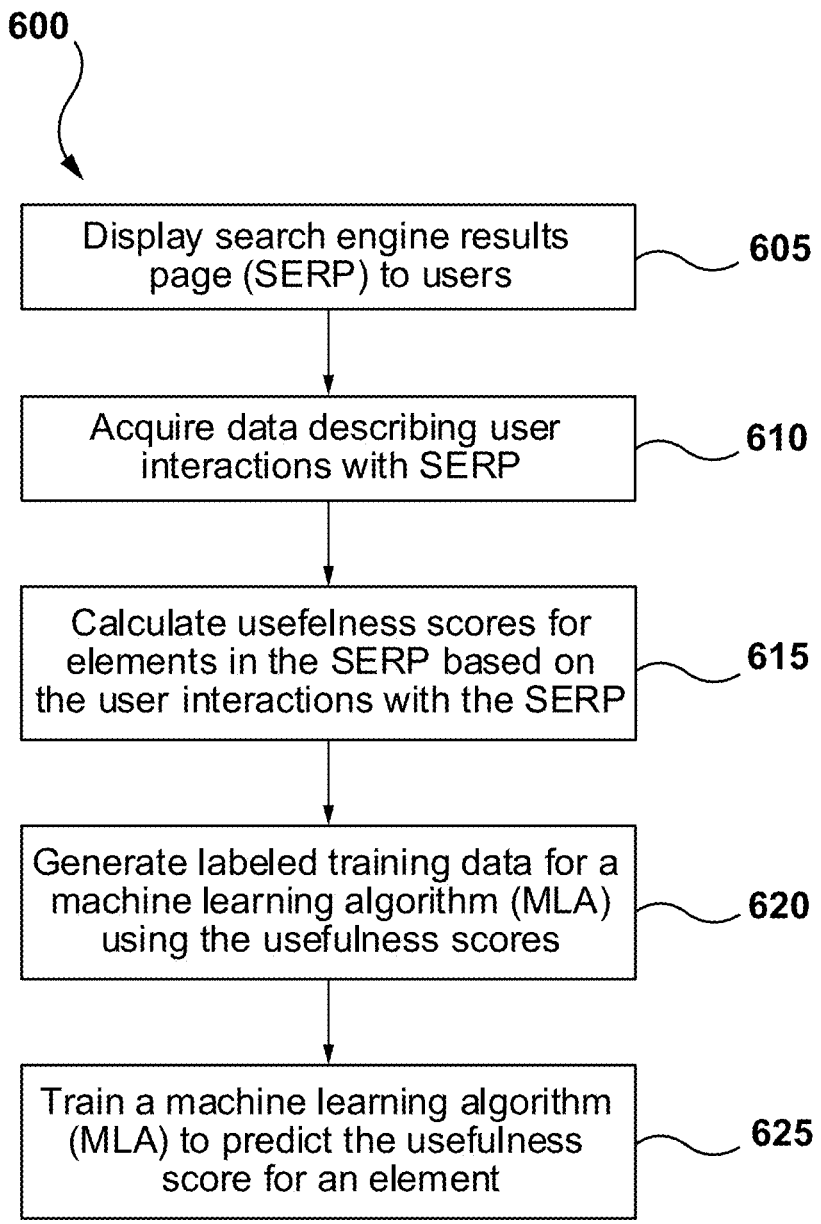
FIG. 6 is a flow diagram of a method for generating a SERP with a content element according to some embodiments of the present technology.

FIG. 6 is a flow diagram of a method 600 for training a machine learning algorithm (MLA) to predict a usefulness score according to some embodiments of the present technology. In one or more aspects, the method 600 or one or more steps thereof may be performed by a computing system, such as the computer system 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order STEP 605: Display SERPs to Users At step 605 SERPs may be displayed to users. The SERPs may be generated specifically for training the MLA and/or the SERPs may be generated during normal usage of a search engine. The SERPs may be generated during normal usage of a search engine, but then manipulated such as for performing A/B testing. For example, a user may submit a query to the search engine, and a ranked list of elements may be determined. One or more elements in the ranked list of elements may then be re-ordered, and the SERP may be generated based on this re-ordered list. The re-ordering may be done randomly, or based on any other method for re-ordering the ranked list.

STEP 610: Acquire Data Describing User Interactions with SERPs

At step 610 data describing user interactions with the SERPs may be acquired. The data may indicate how a user interacted with a SERP, such as which elements in the SERP were selected by the user.

User interactions described in the data can include:
  a selection of an element;
  a long selection (long press) of an element;
  a selection of an element followed by a web resource transition (i.e. selection of an element followed by a visit to the web page corresponding to the element);
  an amount of time that a user spent visiting a web resource corresponding to an element;
  a hovering action over the element;
  un-muting or muting of audio being played by a content element;
  starting or stopping a video in a content element;
  and/or any other interactions between a user and a SERP.

The data describing user interactions may be continuously updated as new searches are performed by users.

STEP 615: Calculate Predicted Usefulness Scores for Elements in the SERF Based on the Data Describing User Interactions At step 615 the data describing user interactions with the SERPs may be used to calculate usefulness scores for elements in the SERP. A usefulness score may be determined for each element displayed in a SERP, or a subset of the elements displayed in a SERP. The usefulness score may be determined based on any combination of features in the data describing user interactions. For example the usefulness score for an element may be determined based on whether the element was selected, whether any other elements were selected after the element was selected, whether any higher-ranked elements were selected, whether any lower-ranked elements were selected, the ranking of the element, the distance of the element from the top of the page, the distance of the element from the left side of the page (i.e. horizontal position of the element), the distance of the element from the top-ranked element (i.e. vertical position of the element), a size of the element (e.g. height or width of the element), and/or any other user interaction data.

Non-limiting examples of the formulas for calculating a usefulness score with respect to the content element 503 will be described below. In these examples, usefulness scores may range from negative one to positive one. But it should be understood that usefulness scores may have any range of values, and may be calculated using various methods.

If the user does not select any element in the SERP 500, the content element 503 may be assigned a usefulness score of zero. Similarly, if an element ranked higher than the content element 503 is selected, the content element 503 may be assigned a usefulness score of zero. In other words, if the user selects the element 501 and then does not interact further with the SERP 500, the content element 503 may be assigned a usefulness score of zero.

If the user selects the content element 503 and then does not have any further interactions with the SERP 500, the content element 503 may be assigned a usefulness score of one. In this example, one is the highest possible usefulness score that may be assigned. This indicates that a user selected the content element 503 and it appears that the user found the content element 503 to be responsive to their query.

If the user selects the element 505, the content element 503 may be assigned a negative usefulness score. The content element 503 was ranked higher than the element 505, because it was predicted to be more likely to be relevant to the user. However, based on the recorded user behavior, the user found the element 505 to be more relevant. Therefore, the content element 503 may be assigned a negative usefulness score. The usefulness score may be determined based on the height of the content element 503. An example formula for determining the usefulness score when a lower-ranked element is selected is the negative of the height 504 divided by the height 506:

Usefulness score=−(height 504/height 506)

If the user selects both the content element 503 and the element 505, the usefulness score assigned to the content element 503 may be the difference between one and the height 504 divided by the height 506:

Usefulness score=1−(height 504/height 506)

The heights 504 and 506 may be provides as a number of pixels or any other measurement of length. It should be understood that the formulas provided above are examples only, and other formulas may be used for determining usefulness scores. Additionally, the determined usefulness scores may be weighted based on various factors. For example, if the content element 503 is a video content element, the determined usefulness score for the content element 503 may be weighted based on an amount of time that a user plays video on the content element 503. The usefulness scores may be weighted, or otherwise adjusted, based on an amount of time that a user visits the web page corresponding to the element.

STEP 620: Generate Labeled Training Data Using the Usefulness Scores

At step 620 the usefulness scores generated at step 615 may be paired with data describing the corresponding SERP to form labeled training data for training an MLA. All or a portion of the elements in an SERP may be paired with a usefulness score corresponding to the respective element.

STEP 625: Train an MLA to Predict a Usefulness Score for an Element

The MLA may be trained to receive an element as an input and output a predicted usefulness score of the element. The labeled training data generated at step 620 may be used to train the MLA. The MLA may receive an element and/or other data relating to the element from the labeled training data as input. The input may include a height of the element, type of the element, ranking of the element, distance of the element from the top of the SERP, distance of the element from the side of the SERP, and/or any other data related to the element. The MLA may then predict a usefulness score for the element based on the input. The predicted usefulness score may be compared to the usefulness score in the labeled training data. A difference (i.e. loss) may be determined between the predicted usefulness score and the usefulness score in the labeled training data, and the MLA may be adjusted based on the difference. Various other methods may be used for training the MLA.

After being trained, the MLA may receive information corresponding to an element as input, such as a size of the element, height of the element, type of element, and/or any other information describing the element. The MLA may receive a ranking and/or distance from the top of the SERP of an element, and then output a predicted usefulness score corresponding to that ranking. The MLA may output a predicted usefulness score for each possible ranking of the element.

Method for Generating a SERF (Non-Limiting Embodiment)

Figure 7:
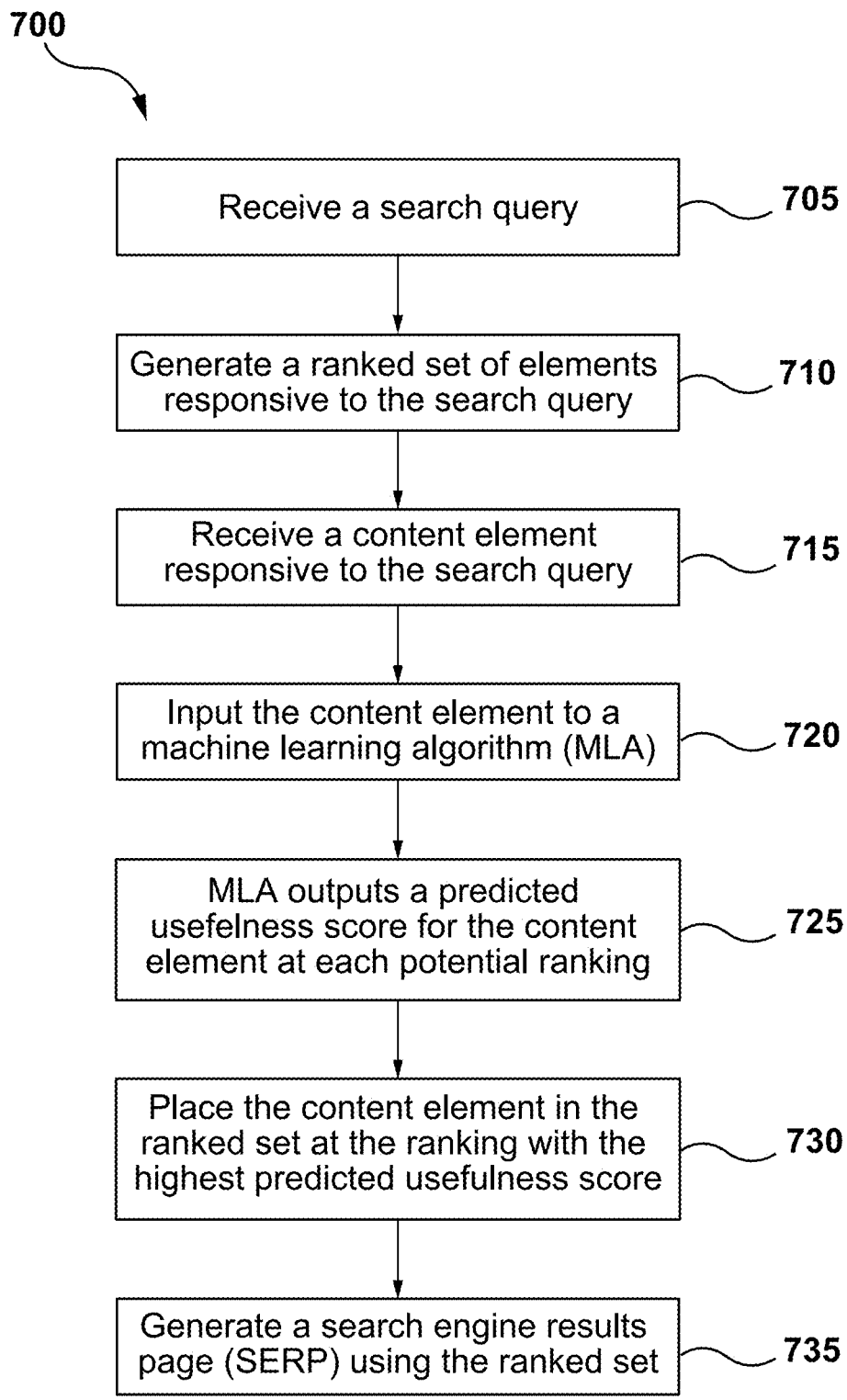
FIG. 7 is a flow diagram of a method for generating a SERP according to some embodiments of the present technology.

FIG. 7 is a flow diagram of a method 700 for generating a SERP with a content element according to some embodiments of the present technology. In one or more aspects, the method 700 or one or more steps thereof may be performed by a computing system, such as the computer system 100. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

STEP 705: Receive a Search Query

At step 705 a search query may be received. The search query may be a textual query and/or any other format of query, such as an audio query. The search query may be input by a user of a search engine.

STEP 710: Generate a Ranked Set of Elements Responsive to the Search Query

At step 710 a ranked set of elements responsive to the search query may be determined. A set of elements that are predicted to be responsive to the search query may be retrieved. A ranking system may then rank all or a portion of the retrieved elements. The ranking system may predict, for each of the retrieved elements, one or more predicted usefulness scores. The predicted usefulness scores may then be used to rank the elements. The highest-ranked element in the ranked set of elements may have a highest predicted usefulness of the elements in the ranked set of elements.

STEP 715: Receive a Content Element Responsive to the Search Query

At step 715 one or more content elements responsive to the search query may be received. Each content element may have an associated size, such as a length dimension and/or a width dimension. The size may be indicated using any suitable measurement, such as number of pixels etc.

STEP 720: Input the Content Element to an MLA

At step 720 the content element or content elements received at step 715 may be input to an MLA. The MLA may be the MLA trained at step 625 of the method 600. The MLA may receive information describing the content element, such as a type of the content element, size of the content element, etc. A ranking and/or distance from the top of the SERP may be input to the MLA.

STEP 725: MLA Outputs Predicted Usefulness Scores for the Content Element

At step 725 the MLA may output predicted usefulness scores for the content element. The MLA may output any number of predicted usefulness scores for each content element. A predicted usefulness score may be output for each possible ranking in the ranked set of elements, or a subset of possible rankings in the ranked set of elements. The predicted usefulness score may be determined based on a size of the content element, such as a height of the content element. In some instances, rather than inputting a size of the content element, the size of the content element may be configurable and may be output by the MLA. In that case the MLA may be used to determine a size of the content element and a ranking of the content element.

STEP 730: Place the Content Element in the Ranked List of Elements

At step 730 the content element may be placed in the ranked list of elements. At step 725 predicted usefulness scores may have been determined for the content element at a plurality of potential rankings. The ranking having the highest predicted usefulness score may be selected, and the content element may be placed at that ranking. The ranking may be selected to maximize a sum of the predicted usefulness scores of elements displayed in the SERP.

STEP 735: Place the Content Element in the Ranked List of Elements

At step 735 a SERP may be generated using all or a portion of the ranked set of elements. The SERP may be output to the user that submitted the search query. Interactions with the SERP may be measured, and used to further train the MLA used to predict the usefulness scores of the elements.

The method 700 describes using the MLA trained using the method 600 to rank content elements. As described in the method 800 below, the MLA may be used to rank all elements.

Method for Generating a SERF (Non-Limiting Embodiment)

Figure 8:
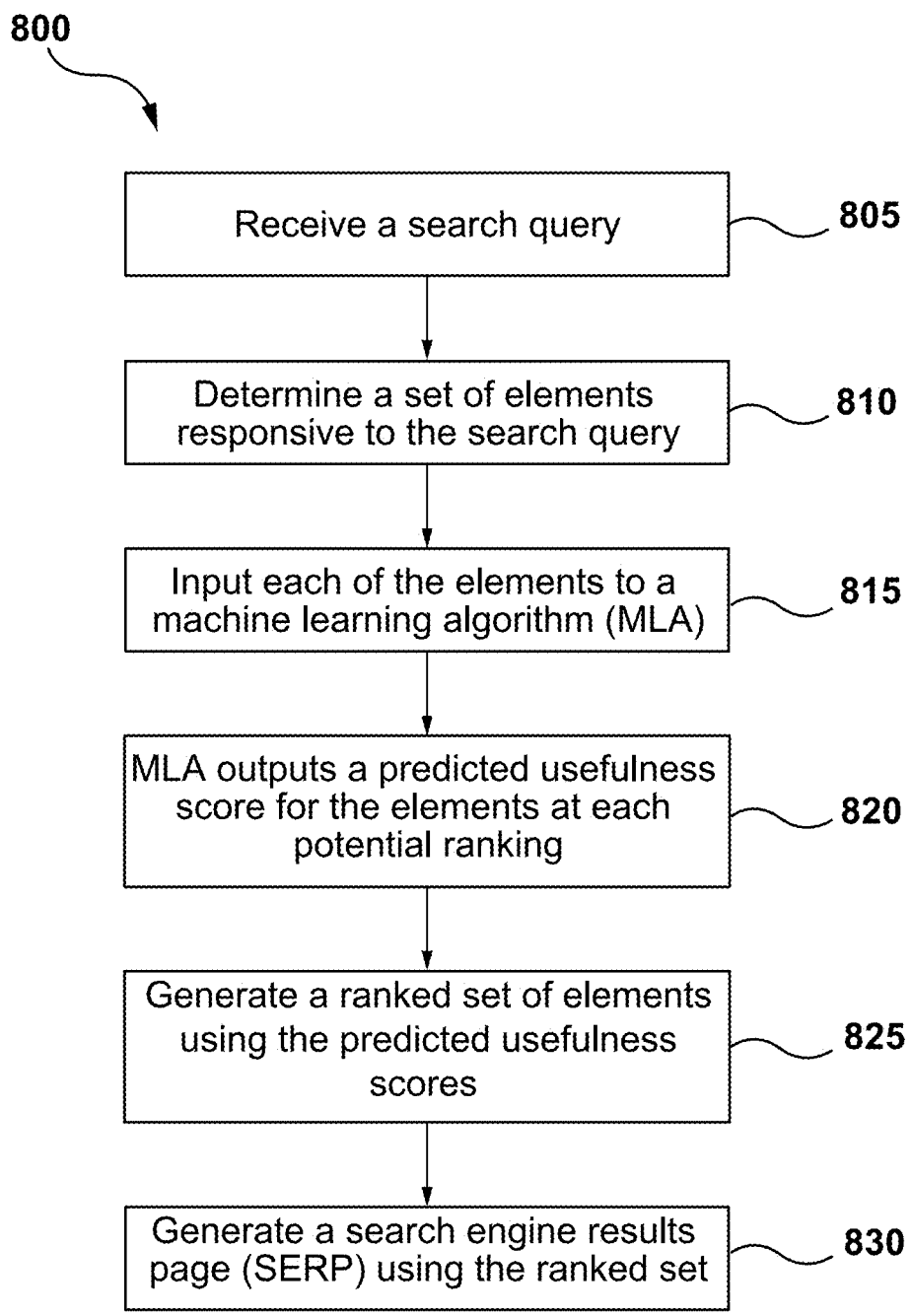
FIG. 8 depicts elements on a SERP according to some embodiments of the present technology.

FIG. 8 is a flow diagram of a method 800 for generating a SERP according to some embodiments of the present technology. In one or more aspects, the method 800 or one or more steps thereof may be performed by a computing system, such as the computer system 100. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

STEP 805: Receive a Search Query

At step 805 a search query may be received. Actions performed at step 805 may be similar to those described above with regard to step 705.

STEP 810: Determine a Set of Elements Responsive to the Search Query

At step 810 a set of elements responsive to the search query may be determined. A set of elements that are predicted to be responsive to the search query may be retrieved. The set of elements may include one or more content elements. Any number of elements may be retrieved. A maximum number of elements to retrieve may have been pre-selected.

STEP 815: Input Each of the Elements to an MLA

At step 815 all or a portion of the elements received at step 810 may be input to an MLA. The MLA may be the MLA trained at step 625 of the method 600. The MLA may receive information describing each of the elements, such as a type of the element, size of the element, etc. A selected ranking and/or selected distance from the top of the SERP may be input to the MLA with each element. Any other information describing the element may be input to the MLA.

STEP 820: MLA Outputs Predicted Usefulness Scores for the Elements

At step 820 the MLA may output predicted usefulness scores for the elements. For each element, a predicted usefulness score may be output for each potential ranking of the respective element. The MLA may output any number of predicted usefulness scores for each element. A predicted usefulness score may be output for each possible ranking of the element, or a subset of possible rankings. For each element, the predicted usefulness score may be determined based on a size of the element, such as a height of the element.

STEP 825: Generate a Ranked Set of Elements

At step 825 a ranked set of elements may be determined based on the predicted usefulness scores. A ranking may be selected for each of the elements based on the predicted usefulness scores generated at step 820. The ranking may be selected in order to maximize the overall predicted usefulness scores for the elements on the SERP. A heuristic algorithm may be used to select the rankings.

STEP 830: Generate a SERP Using the Ranked Set of Elements

At step 830 a SERP may be generated using all or a portion of the ranked set of elements. Actions performed at step 830 may be similar to those described with regard to step 735.

It should be apparent to those skilled in the art that at least some embodiments of the present technology aim to expand a range of technical solutions for addressing a particular technical problem, namely determining rank positions of elements by a ranking system.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining rank positions of elements displayed on a search engine results page (SERP) by a ranking system, the ranking system having been trained to rank elements based on previous user interactions, the method executable by a server, the method comprising:
during a training phase of the ranking system:
acquiring, by the server, an indication of user interactions associated with a first ranked list of elements, elements of the first ranked list of elements having been visually displayed on a first SERP to a user in response to a training query, wherein the first ranked list of elements comprises a first content element;
determining, by the server, a score for the first content element based at least in part on:
comparing a size of the first content element on the first SERP and a size of a second content element on the first SERP,
a ranking, in the first ranked list of elements, of the first content element, and
an amount of time that a user viewed content associated with the first content element; and
training, by the server, the ranking system to predict the score for the first content element, wherein training the ranking system comprises determining a difference between a predicted usefulness score output by the ranking system and the score, and adjusting the ranking system based on the difference; and
during an in-use phase of the ranking system:
receiving, by the server, an in-use query from a user;

generating, by the ranking system based on the in-use query, a second ranked list of elements;
determining, by the ranking system, a ranked position for a second content element in the second ranked list of elements based at least in part on a size of the second content element and a distance between the second content element and a top-ranked element of the second ranked list of elements;
placing, by the server, the second content element in the second ranked list of elements at the ranked position; and
generating, based on the second ranked list of elements, a second SERP.

2. The method of claim 1, wherein determining the score for the first content element comprises:
after determining that the user selected an element displayed above the first content element on the first SERP, setting the score to zero.

3. The method of claim 1, wherein determining the score for the first content element comprises:
after determining that the user selected the first content element on the first SERP, setting the score to one.

4. The method of claim 1, wherein determining the score for the first content element comprises, after determining that the user selected an element displayed below the first content element on the first SERP:
determining a first height of the first content element;
determining a second height of the element displayed below the first content element; and
subtracting the first height divided by the second height from the score.

5. The method of claim 1, wherein determining the ranked position for the second content element comprises determining, for each position in the ranked list, a predicted usefulness score of the second content element.

6. The method of claim 5, wherein the ranked position for the second content element has a highest predicted usefulness score of the predicted usefulness scores.

7. The method of claim 1, wherein determining the amount of time that the user viewed content associated with the first content element comprises determining an amount of time that the user viewed a video associated with the first content element.

8. The method of claim 1, wherein the second content element comprises one or more images or videos.

9. The method of claim 1, wherein determining the score for the first content element comprises determining the score based at least in part on a horizontal position of the first content element.

10. The method of claim 1, wherein determining the score for the first content element comprises:
determining a distance on the SERP of the first content element from a highest ranked element; and
determining, based at least in part on the distance, the score.

11. The method of claim 1, wherein determining the score for the first content element comprises, after determining that the user selected an element displayed below the first content element on the first SERP:
determining a first number of pixels of a height of the first content element;
determining a second number of pixels of a height of the element displayed below the first content element; and
subtracting, from the score, the first number of pixels divided by the second number of pixels.

12. A method of determining rank positions of elements displayed on a search engine results page (SERP) by a ranking system, the ranking system having been trained to rank elements based on previous user interactions, the method executable by a server, the method comprising:
during a training phase of the ranking system:
acquiring, by the server, an indication of user interactions associated with a first ranked list of elements, elements of the first ranked list of elements having been visually displayed on a first SERP to a user in response to a training query;
determining, by the server, a score for each element of the first ranked list of elements based at least in part on:
comparing a size of the respective element on the first SERP and a size of another element on the first SERP,
a ranking, in the first ranked list of elements, of the respective element, and
an amount of time that a user viewed content associated with the respective element; and
training, by the server, the ranking system to predict the score for each element, wherein training the ranking system comprises determining a difference between a predicted usefulness score output by the ranking system for each element and the score for the respective element, and adjusting the ranking system based on the difference; and
during an in-use phase of the ranking system:
receiving, by the server, an in-use query from a user;
generating, by the ranking system based on the in-use query, a set of elements;
determining, by the ranking system, a ranked position for each element of the set of elements based at least in part on a size of each respective element, thereby generating a second ranked list of elements; and
generating, based on the second ranked list of elements, a second SERP.

13. The method of claim 12, wherein determining the score for each element of the first ranked list of elements comprises:
after determining that the user selected an element displayed above a respective element on the first SERP, setting the score of the respective element to zero.

14. The method of claim 12, wherein determining the score for each element of the first ranked list of elements comprises:
after determining that the user selected an element displayed below a respective element on the first SERP:
determining a first height of the respective element;
determining a second height of the element displayed below the respective element; and
subtracting the first height divided by the second height from the score of the respective element.

15. The method of claim 12, wherein determining the ranked position for each element of the set of elements comprises determining, for each element of the set of elements, a predicted usefulness score for each available ranking of the respective element.

16. The method of claim 15 wherein determining the ranked position for each element of the set of elements comprises selecting, for each element of the set of elements, a ranking having a highest predicted usefulness score.

17. The method of claim 12, further comprising triggering a visual display of the second SERP.

18. The method of claim 12, wherein the indication of user interactions comprise an indication of: a selection of an item in the first SERP, a long selection of the item, the selection of the item followed by a web resource transition, playing audio corresponding to the item, or a hovering action over the item.

19. A system comprising:
- at least one processor, and
- memory storing a plurality of executable instructions which, when executed by the at least one processor, cause the system to:
- during a training phase of a ranking system:
    - acquire an indication of user interactions associated with a first ranked list of elements, elements of the first ranked list of elements having been visually displayed on a first search engine results page (SERP) to a user in response to a training query, wherein the first ranked list of elements comprises a first content element;
    - determining a score for the first content element based at least in part on:
        - comparing a size of the first content element on the first SERP and a size of a second content element on the first SERP,
        - a ranking, in the first ranked list of elements, of the first content element, and
        - an amount of time that a user viewed content associated with the first content element; and
    - training the ranking system to predict the score for the first content element, wherein training the ranking system comprises determining a difference between a predicted usefulness score output by the ranking system and the score and adjusting the ranking system based on the difference; and
- during an in-use phase of the ranking system:
    - receiving an in-use query from a user;
    - generating, by the ranking system based on the in-use query, a second ranked list of elements;
    - determining, by the ranking system, a ranked position for a second content element in the second ranked list of elements based at least in part on a size of the second content element and a distance between the second content element and a top-ranked element of the second ranked list of elements;
    - placing, by the server, the second content element in the second ranked list of elements at the ranked position; and
    - generating, based on the second ranked list of elements, a second SERP.

20. The system of claim 19, wherein the instructions that cause the system to determine the score for the first content element comprises instructions that cause the system to compare the size of the first content element on the first SERP to a size of a selected element on the first SERP.

* * * * *